(No Model.)
T. H. McCULLOCH.
PURIFIER FOR WATER OR OTHER LIQUIDS.
No. 399,429. Patented Mar. 12, 1889.
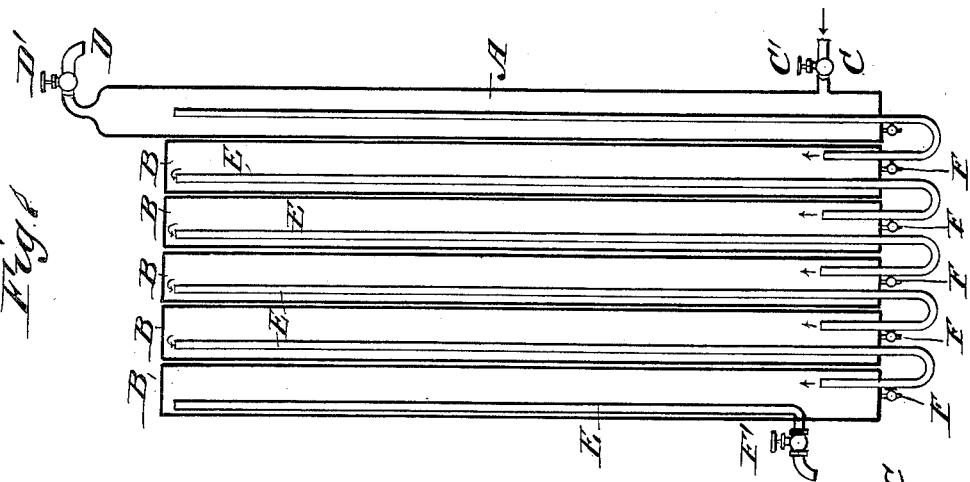
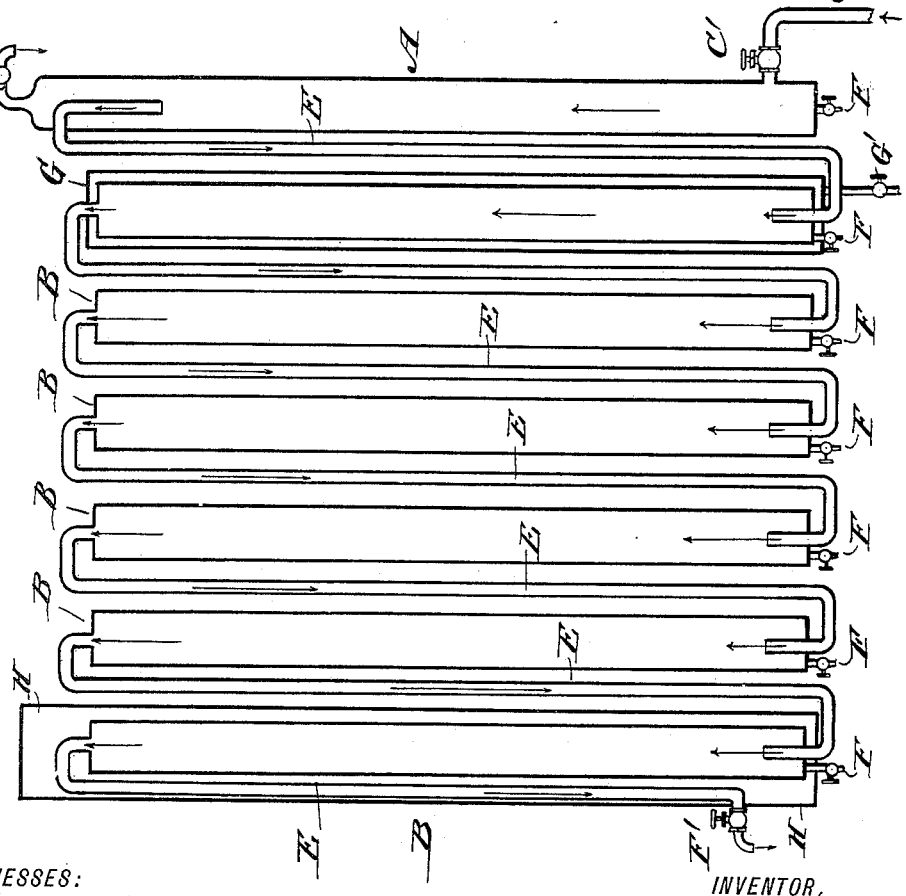
WITNESSES:
F. McArdle
C. Sedgwick
INVENTOR,
T. H. McCulloch
BY Munn & Co
ATTORNEY.

UNITED STATES PATENT OFFICE.

THOMAS H. McCULLOCH, OF OMAHA, NEBRASKA.

PURIFIER FOR WATER OR OTHER LIQUIDS.

SPECIFICATION forming part of Letters Patent No. 399,429, dated March 12, 1889.

Application filed May 28, 1888. Serial No. 275,320½. (No model.)

*To all whom it may concern:*

Be it known that I, THOMAS H. McCULLOCH, of Omaha, in the county of Douglas and State of Nebraska, have invented a new and Improved Purifier for Water and other Liquids, of which the following is a full, clear, and exact description.

My invention is a purifier for water and other liquids; and it consists in the parts which will be hereinafter described, and pointed out in the claims.

The object of the invention is to provide a simple and effective device through which water may be passed and purified in its passage. The impure water being admitted at one side of the device is discharged in a pure state from the opposite side. The water in its passage is relieved of its sediment and floating substance and the germs and microbes therein destroyed, the water being first heated and then cooled.

My invention may be used in connection with any water-supply, but it is particularly adapted for use in water-works.

The use of the invention may be extended to the purification of any liquid containing a floating substance or sediment requiring separation.

The device may be mounted in a frame or supported in any suitable manner.

Reference is to be had to the accompanying drawings, forming a part of this specification, in which similar letters of reference idicate corresponding parts in all the figures.

Figure 1 represents a sectional elevation of my invention. In this view the body of the pipes which connect the series of tubes lies within the tubes. Fig. 2 is also a sectional elevation of the device. In this view the main body of each connecting-pipe lies outside of the tubes. In said view the second settling tube or reservoir from the left is provided with an outer casing for containing heated water, steam, hot air, &c. The last settling-tube in the series is also incased. This casing is for the reception of ice, ammonia, &c., for cooling purposes. The arrows represent the course of the water.

The letter A represents the first reservoir or settling-tube of a series, and B indicates the other settling-tube in said series. The first tube, A, of the series is longer than the other tubes, and it extends above them, so as to leave a space for floating substance. The bottoms of all the tubes are on a level.

C is an induction-pipe in the lower side of tube A, and communicating therewith. This pipe is provided with a stop-cock, C'. The upper end of the settling-tube A is provided with a pipe, D, having a stop-cock, D', for drawing off the floating substance that may rise to the upper end of said tube.

E represents a series of pipes having open ends for connecting the series of settling-tubes.

In Fig. 1 each tube is provided with a pipe, E, on its inner side. There is a space intervening between the upper end of each connecting-pipe and the under side of the top of the tube. The lower end of each connecting-pipe passes through an opening in the bottom of its tube, and the said lower end of each pipe is curved upward and extends through an opening in the bottom of the adjacent tube. Each settling-tube is connected to its adjacent tube by one of these pipes. The pipe in the last tube in the series extends upward and occupies a position similar to the others. The lower end of this pipe, however, passes through an opening in the lower side of the tube and the outer end thereof is provided with a cock, F'. The bottom of each settling-tube is provided with a short pipe and cock, F, for drawing off the sediment.

In Fig. 2 the connecting-pipes E are S-shaped. The first pipe in this series is longer than the others, and its upper end is engaged in an opening in the upper side of the first or long tube, A. The upper end of this pipe extends downward inside the tube, so as to leave considerable space between its open end and the upper end of the tube for the accumulation of floating substance.

The first settling-tube in the B series adjacent to the long tube A is provided with an outer casing, G, so as to leave a space between said casing and tube for the reception of steam, hot air, &c., whereby the water to be purified may be heated to a degree sufficient to destroy the germs and microbes tha may exist therein.

G' represents a pipe, having a stop-cock, which may communicate with an opening in the casing G at any desirable point, for the introduction of steam, hot air, &c.

Each connecting-pipe E in the series, Fig. 2, has its upper end engaged in an opening in the upper end of a tube, its lower end being engaged in an opening in the bottom of the adjacent tube. The lower end of each of these pipes extends a small distance upward in the tube in which it is engaged, so as to leave a space between its open end and the bottom of the tube for sediment. This feature is the same in both views, and its object is to have the water enter each tube above the sediment-line.

The last settling-tube in the series, Fig. 2, is provided with a casing, H. This casing completely incloses the tube, so as to leave an intervening space for ice, ammonia, &c., or other cooling materials or processes. The body of the last or discharge pipe in this series lies within the cooling-casing. The lower end of this pipe extends outward through an opening in the lower side of the casing, and it is provided with a stop-cock, F'. The bottom of each tube in both figures is provided with a short pipe, F, and stop-cock. Each short pipe F communicates with the interior of a tube, and it is for drawing off of sediment.

The operation of the invention is as follows: Water to be purified is admitted into the settling-tube A through the induction-pipe C. Water going in under pressure is carried to the top of said tube, the floating particles being carried above the open end of the pipe E, Fig. 1. The water at the same time will flow into the opening in the upper end of the said pipe and pass downward and outward into the adjacent tube B. The water will then pass upward in the tube B and overflow into the upper end of its pipe, thence downward through the pipe and into the under side of the adjacent tube, and so on throughout the series until it is discharged through the cock F' of the last tube. A part of the sediment in the water will be deposited in the bottom of the first tube. The same water will also deposit a part of its sediment in the second tube, and so on throughout the series. When the water reaches the last tube, it will be free from sediment. The purest water, of course, always rises to the top; hence the result stated.

My object in incasing the second settling-tube in the series is that the first tube may catch the floating substance. If this substance were passed to the second or heating tube, it might, by being boiled therein, color or spoil the water. When hot water is wanted for laundry purposes, &c., the incased tube to be heated is preferably the last one in the series. By using the casing and cooling process in connection with one of my tubes I am enabled to obtain cold water free from the impurities of ice and free from living germs.

It will be observed in Fig. 2 that the upper end of each connecting-pipe opens into the top of the tube. The result is, however, substantially the same as the result obtained by the construction shown in Fig. 1.

Having thus described my invention, I claim as new and desire to secure by Letters Patent—

1. The combination, with a series of settling-tubes, A B, the first tube, A, having an inlet-pipe, C', at its lower end and an outlet at its upper end, of the pipes E, connecting said tubes, the upper end of each said pipes communicating with the interior of a tube at its upper end and the lower side of the adjacent tube, the last pipe extending out of the top of last tube and having a discharge-cock, substantially as set forth.

2. In a purifier for water and other liquids, the combination of a series of settling-tubes, the first tube of said series extending above the top of the adjacent tube, the upper end of said first tube being provided with a pipe for discharging the floating substance, a series of connecting-pipes having open ends connecting said settling-tubes, the upper end of each of said pipes communicating with the interior of a tube, so as to receive the water that may rise to the upper end of said tube, the lower end of each pipe communicating with the lower side of the adjacent tube, substantially as specified.

3. In a purifier for water and other liquids, the combination of a series of settling-tubes, and a series of connecting-pipes having open ends connecting said settling-tubes, the upper end of each of said pipes communicating with the interior of a tube, so as to receive the water that may rise to the upper end of said tube, the lower end of each pipe communicating with the lower side of the adjacent tube, one or more of the tubes being provided with a casing, so as to leave a space between said tube and casing, substantially as specified.

4. In a purifier for water and other liquids, the combination of a series of settling-tubes and a series of connecting-pipes having open ends connecting said settling-tubes, the upper end of each of said pipes communicating with the interior of a tube, so as to receive the water that may rise to the upper end of said tube, the lower end of each pipe communicating with the lower side of the adjacent tube, one of the settling-tubes being provided with an opening or pipe for the induction of water, and an opening or pipe in one of the said tubes for the discharge of purified water, substantially as specified.

THOMAS H. McCULLOCH.

Witnesses:
   JAMES F. ROBINSON,
   THOMAS B. McCULLOCH.